United States Patent

Sepehri et al.

[11] Patent Number: 5,721,477
[45] Date of Patent: Feb. 24, 1998

[54] NONLINEAR PROPORTIONAL INTEGRAL CONTROLLER

[75] Inventors: Nariman Sepehri, Winnipeg; Bradley Edwin Heinrichs, Surrey; Amir Ali-Akbar Khayyat, Winnipeg, all of Canada

[73] Assignee: The University of Manitoba, Canada

[21] Appl. No.: 798,666

[22] Filed: Feb. 11, 1997

[51] Int. Cl.$^6$ ..................................................... B25J 13/00
[52] U.S. Cl. .......................... 318/638; 318/610; 318/620; 901/9
[58] Field of Search ..................... 318/567, 568.1, 318/568.11, 568.22, 610, 615, 616, 617, 638, 620; 901/1, 9, 14, 19, 22, 30

[56] References Cited

U.S. PATENT DOCUMENTS

| | | | |
|---|---|---|---|
| 4,727,303 | 2/1988 | Morse et al. | 318/616 |
| 4,743,822 | 5/1988 | Futami et al. | 318/610 |
| 4,749,928 | 6/1988 | Doutremay et al. | 318/610 |
| 4,860,215 | 8/1989 | Seraji | 364/513 |
| 4,974,210 | 11/1990 | Lee | 901/9 X |
| 5,179,514 | 1/1993 | Rastegar et al. | 318/568.22 X |

OTHER PUBLICATIONS

Field and Stepanenko; "Model Reference Impedance Control of Robotic Manipulators", IEEE 0-7803-0971, May 1993.

Hogan; "Impedance Control: An Approach to Manipulation", Parts I, II, and III, Journal of Dynamic Systems, Measurement, and Control, Mar. 1985.

Nakashima et al; "Application of Semi-Automatic Robot Technology on Hot-Line Maintenance Work", IEEE International Conference on Robotics and Automation, Jun. 1995.

Pelletier and Doyon; "On the Implementation and Performance of Impedance Control on Position Controlled Robots", IEEE 1050-4729/94, 1994.

*Primary Examiner*—Bentsu Ro
*Attorney, Agent, or Firm*—C. A. Rowley

[57] ABSTRACT

A method and apparatus for controlling a hydraulic manipulator defines a position error signal ($\theta_e$), defining a first control signal ($U_P$, $U_{PD}$) based on the position error ($\theta_e$) and generating an improved position error integral signal ($\theta_I$) based on a product of the position error ($\theta_e$) integral signal and a velocity factor $F_V$. The velocity factor $F_V$ is based on a derivative of the position error ($\theta_e$) and a nonlinear function. An integral control signal ($U_I$) is produced based on the improved position error integral signal ($\theta_I$) and is combined with the first signal ($U_P$, $U_{PD}$) to provide an output control signal $U$ to control the manipulator. The invention also preferably includes a system to further reduce overshoot by further modifying the position error signal ($\theta_e$) depending on whether the velocity and acceleration of position are in the same direction and to accommodate stiction at deadband areas of the control by determining a stick induced velocity error signal ($\theta_e^{stiction}$) and modifying the control signal when required.

20 Claims, 1 Drawing Sheet

NONLINEAR PROPORTIONAL INTEGRAL CONTROLLER

FIELD OF INVENTION

The present invention relates to a controller, more particularly, the present invention relates to an accurate position control system for hydraulically-actuated manipulators.

BACKGROUND OF THE INVENTION

Some of the more difficult to master problems encountered in controlling industrial hydraulic manipulators include accurate regulating and tracking movement of the end point preventing overshoot, wherein the endpoint travels beyond its intended destination, the inherent resistance to movement of the components of the system generally referred to herein as "stiction", and deadband nonlinearities, within which the control signal cannot produce any movement. These actions in hydraulic manipulators make control of such equipment significantly more difficult than electrically actuated and operated manipulators. In particular, hydraulic systems utilize valves to control the fluid flow to the driving cylinders and thus, must contend with the movement requirements for the valve to obtain the desired flow to the drive cylinders. Thus, a hydraulic position controller must contend with many nonlinearities and non-idealities including flow deadband and stiction, all of which are present in hydraulic systems. Examples of such systems are heavy-duty industrial excavator-based machines. The actuation systems in these machines are highly coupled and nonlinear. Also, these machines constantly interact with the environment. Impedance control-type systems appear to be very desirable to handle automatic movements and environmental interactions in each system.

Examples of impedance control-type systems as applied to electrically operated devices described in "Model Reference Impedance Control of Robotic Manipulators" by Field, G. and Stepanenko, Y. published in Proceedings—IEEE Pacific Rim Conference, 1993, pp 614–617; "Impedance Control: An Approach to Manipulation, Parts I–III" by Hogan, N. in ASME Journal of Dynamic Systems, Measurement and Control, 1985, Vol. 107, pp 1–24; "Application of Semi-Automatic Robot Technology on Hot-Line Maintenance Work" by Nakashima, M., Yakabe, H., Maruyama, Y., Yano, K. Morita, K. and Nakagaki, H. in Proceedings—IEEE Conference on Robotics and Automation, 1995, pp 843–850; "On the Implementation and Performance of Impedance Control on Position Controlled Robots" by Pelletier, M. and Doyon, M in Proceedings—IEEE Conference on Robotics and Automation, 1994, pp 1228–1233.

U.S. Pat. No. 4,727,303 issued to Morse et al. describes a specific system for applying an offset signal to compensate for steady-state error in controlling electrically-actuated robot. Morse et al.'s system works by resetting the error integral at high speeds and therefore works well for step changes in setpoint only. When high-speed trajectory tracking is required, Morse et al.'s system reduces the control action to a simple proportional gain; thus, is not effective in ensuring proper tracking of the end-point along selected trajectory. Further, it does not compensate for velocity reversals.

Other U.S. patents disclosing various control circuits include U.S. Pat. No. 4,743,822 issued May 16, 1988 to Futami et at., U.S. Pat. No. 4,860,215 issued Jun. 7, 1988 to Seraji and U.S. Pat. No. 4,749,928 issued Aug. 22, 1989 to Dautremay et at.

Generally, in an electrically operated robot, motor current is used to control joint forces (torque) which is easily done since the motor current and motor torque are directly proportionally related. This relationship is obviously not present in hydraulically actuated equipment. For this reason, position-based impedance control is highly desirable in hydraulic systems.

BRIEF DESCRIPTION OF THE PRESENT INVENTION

It is Applicants' intention to provide an implementation of impedance control that does not require controlled actuator torque in the form of a position-based impedance control. The position-based impedance control is actually a position controller nested within a force feedback loop. The success of the scheme, however, relies on the efficacy of its nested position controller. When in contact with an environment, the forces at the implement will be very dependent on small changes in its position. The present invention permits the use of position-based impedance control on industrial hydraulic manipulators.

It is an object of the present invention to provide a robust position control system for a hydraulic manipulator or robot to accurately and quickly position a robotic arm. It is a further object of the present invention to provide a control system that is capable of both good tracking and regulation of the arm movement and helps to overcome the problem of stiction and to provide the required control signals quickly and retain all these properties for both large and small changes in set points.

Broadly, the present invention relates to an improved controller for a hydraulic manipulator comprising means for generating a position error signal ($\theta_e$), proportional (proportional-derivative) controller means to define a first control signal $U_P$ ($U_{PD}$), means for determining a velocity factor $F_V$ based on a derivative of said position error ($\theta_e$) and a nonlinear function, means for generating an improved position error integral signal ($\theta_I$) based on the product of said position error integral and said velocity factor $F_V$, means to provide an integral control signal ($U_I$) based on said improved position error integral signal ($\theta_e$) and means for combining said integral control signal ($U_I$) with said first signal ($U_P$, $U_{PD}$) to provide an output control signal U to control said manipulator.

Broadly, the present invention also relates to an improved method of controlling a hydraulic manipulator comprising defining a position error signal ($\theta_e$), defining a first control signal $U_P$ ($U_{PD}$) based on said position error, $\theta_e$, (and its derivative generating an improved position error integral signal ($\theta_I$) base on a product of said position error signal ($\theta_e$) integral and a velocity factor $F_V$, said velocity factor $F_V$ being based on a derivative of said position error ($\theta_I$) and a nonlinear function, providing integral control signal ($U_I$) based on said improved position error integral signal ($\theta_I$) and combining said integral control signal ($U_I$) with said first signal ($U_P$ or $U_{PD}$) to provide an output control signal U to control said manipulator.

Preferably, said means for generating a position error signal ($\theta_e$) includes, means to input a desired position ($\theta_d$), means for generating a position error signal ($\theta_e$) based on said desired position ($\theta_d$a) and a then current actual position of said manipulator ($\theta_a$).

Preferably, the position error ($\theta_e$) is modified based on a comparison of directions of first and second derivatives of said desired position ($\theta_d$) and the value of the position error signal ($\theta_e$) modified only when the first and second derivatives have different signs by adding a modifying signal ($\theta_G$) to the position error signal ($\theta_e$) to provide a modified position error signal ($\theta_m$) that is used to replace said position error signal ($\theta_e$) in defining said integral control signal ($U_I$).

Preferably said nonlinear function, $F_V$, will be $$\frac{\alpha}{\alpha + \theta_e^2} \quad (1)$$

where:

$\alpha$=a constant having a value of at least 8 degree$^2$/second$^2$ (deg.$^2$/s$^2$) for revolute joints and 0.02 m$^2$/s$^2$ for prismatic joints; generally may be obtained from the following relation:

$$\alpha = \alpha_{max}\left[0.001 + \frac{|\dot\theta_d|}{\dot\theta_{max}}\right] \quad (2)$$

where:

$\alpha_{max}$=at least 8000 deg.$^2$/s$^2$ for revolute joints and at least 20 m$^2$/s$^2$ for prismatic joints $\dot\theta_{max}$=about 10 deg./s (for revolute joints) or 0.2 m/s (for prismatic joints) for most heavy-duty hydraulic applications Preferably, said control will further include determining of stiction velocity error ($\dot\theta_e^{stiction}$) based on desired velocity ($\dot\theta_d$) derived from a derivative of said desired position ($\theta_d$), and actual velocity ($\dot\theta_a$) derived from a derivative of said actual position ($\theta_a$), determining whether said stiction velocity error ($\dot\theta_e^{stiction}$) is within a selected range, and substituting an output signal $U_L$ or $U_U$ for control signal U.

Preferably, said determining stiction velocity error ($\dot\theta_e^{stiction}$) is based on the function $$\dot\theta_e^{stiction} = (\dot\theta_d - \dot\theta_a)\frac{\dot\theta_d^2}{\dot\theta_d^2 + \beta\dot\theta_a^2} \quad (3)$$

where:

$\beta$=shape factor having a value of between 5 and 500 for many heavy-duty hydraulic applications

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
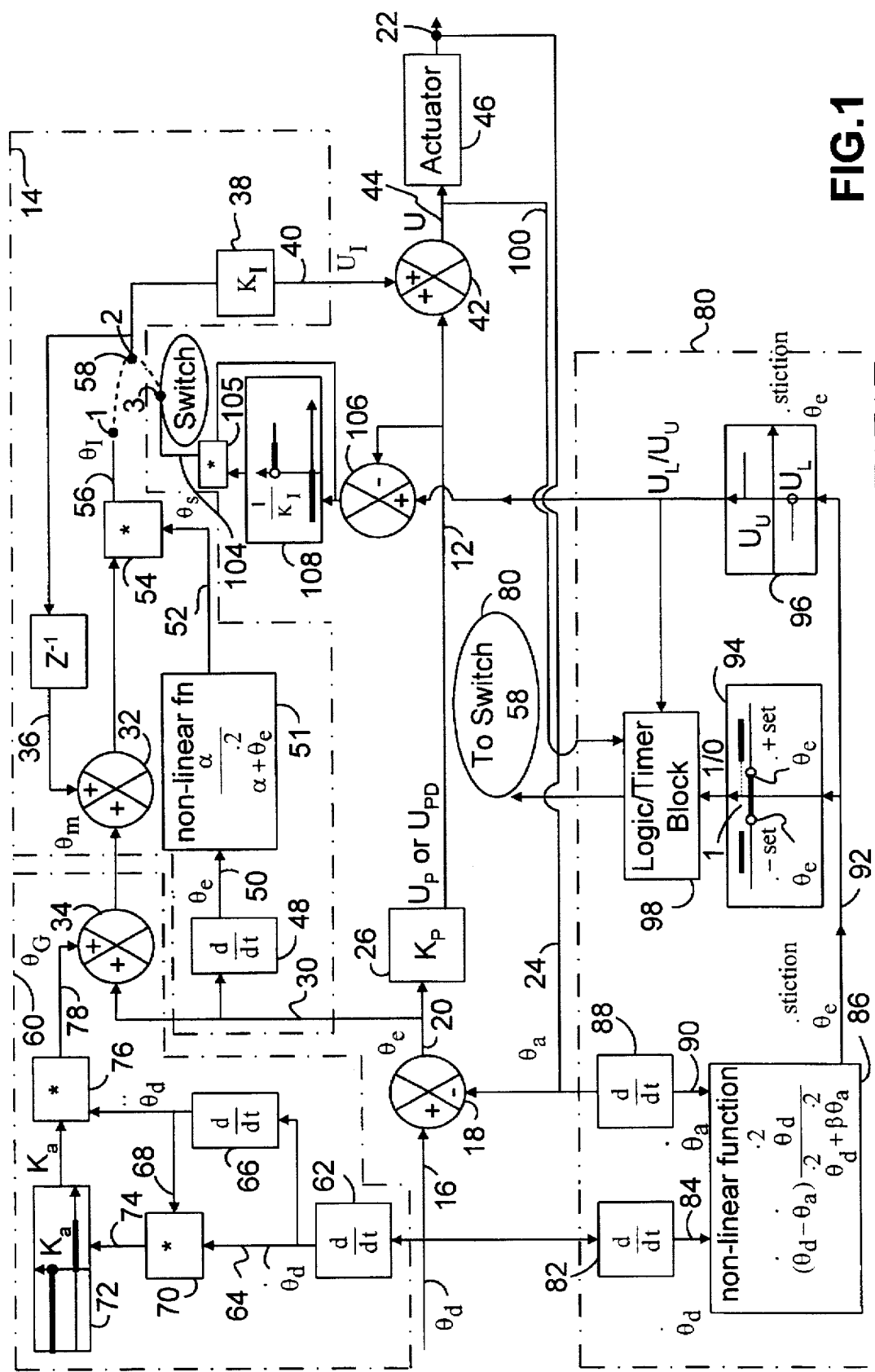
FIG. 1 is a schematic illustration of a control system constructed in accordance with the present invention.

The present invention as illustrated in FIG. 1 has been shown as applied to a simple position proportional control system generating an output $U_P$, which is modified by a novel integral control signal $U_I$ to generate the output signal U that controls the actuator. It will be apparent that the proportional control signal $U_P$ may be based solely on position error ($\theta_e$), but may also be based on velocity (linear or angular) error or a combination of position and velocity errors in a known manner to provide a $U_{PD}$ (proportional-derivative) signal as opposed to a $U_P$ (proportional) signal. Thus, the signal shown in FIG. 1 carded in line 12 may either be a $U_P$ or a $U_{PD}$ signal.

The control of the present invention includes three main modifications to conventional controls to produce a better and robust output signal U.

One of these modifications is the system contained within the dot-dash lines 14 simply multiplies the position error (output from summing node 32) by a velocity-error-varying factor $F_V$ (see FIG. 1) which is determined based on a nonlinear function applied in each control iteration. This factor $F_V$ is unity (1) at 0 velocity error ($\theta_e$) and approaches zero (0) as the velocity error signal increases. The so modified PI controller, which will be described hereinbelow, tends to eliminate the problems of actuator saturation and integral windup and allows the use of larger integral gains ($K_I$) thereby improving both regulating and tracking abilities of the system over a wide range of inputs.

The basic system plus the velocity-error-varying factor, as above indicated, is contained within the dot-dash line 14 and provides for an input of desired position $\theta_d$ in line 16 which is delivered to the subtractor 18 where the actual position $\theta_a$ is subtracted therefrom to generate the position error signal $\theta_e$ in line 20.

The actual position $\theta_a$ is sensed in the actuator indicated schematically at point 22 and the actual position $\theta_a$ is delivered to the subtractor 18 via line 24.

The signal in line 20 is processed in a proportional controller 26 to provide an output signal $U_P$, in line 12 which as above described may also be a $U_{PD}$ signal.

In a conventional integral controller herewith called I controller, the position error $\theta_e$ is carried by a line 30 to an adder 32, i.e. normally, the adder 34 to be described below and which is outside the box 14 would not be present. However, for the function of the present invention and a further modification of the system, it is included.

To carry on with the description of a conventional integral controller, the error signal $\theta_e$ would normally be added to the previous position error signal in line 36 to generate an output signal that would then be modified in the proportion of controller 38 to generate an integral signal $U_I$ in line 40. This $U_I$ is then added to the signal $U_P$, (or $U_{PD}$) in line 12 in the adder 42 to generate the control signal U in line 44 and this signal is then delivered to the hydraulic actuator 46 and controls the operation of the actuator.

With the present invention, the position error $\theta_e$ in line 30 is processed by first obtaining the derivative thereof as indicated at 48 to provide velocity error signal $\dot\theta_e$ in line 50 and is then processed using a nonlinear function which generates a velocity error factor $F_V$, which, in the illustrated arrangement, is based on the formula $$F_V = \frac{\alpha}{\alpha + \dot\theta_e^2} \quad (1)$$

where:

$\alpha$=a constant having a value of at least 8 deg$^2$/s$^2$ for revolute joints and 0.02 m$^2$/s$^2$ for prismatic joints, or preferably follows the following relation:

$$\alpha = \alpha_{max}\left[0.001 + \frac{|\dot\theta_d|}{\dot\theta_{max}}\right] \quad (2)$$

where:

$\alpha_{max}$=at least 8000 deg.$^2$/s$^2$ for most heavy-duty hydraulic applications with revolute joints, and at least 20 m$^2$/s$^2$ for most heavy-duty hydraulic applications with prismatic joints $\dot\theta_e$=velocity error base on the position error $\theta_e$ $|\dot\theta_d|$=absolute desired velocity $\dot\theta_{max}$=a maximum set-point for velocity and can be 10 deg./s for most heavy duty hydraulic applications having revolute joint, or 0.2 m/s for prismatic joint The above values, however, are not absolute and are normally determined empirically and are based on the intended application.

The so processed velocity error signal $\theta_e$ is carried via a line 52 to multiplier 54 where it is multiplied with the output from the adder 32 to produce an improved position error integral signal $\theta_I$ that is carried via line 56 to the proportional modifier 38 when the switch 58 is in the position connecting Terminal 1 and Terminal 2. If the device for compensating stiction is not used as will be described below, the Terminals 1 and 2 may be directly interconnected and the switch 58 eliminated. However, for best operation of the system, the stiction error control portion will be included.

It will be apparent that the modified system nonlinear function as applied indicated at 51 to provide factor $F_V$ that is carded via line 52 to the multiplier 54, where it is multiplied with the output from adder 32 to provide the improved error integral signal $\theta_I$ and thereby significantly changes in the signal delivered to the proportional block 38.

In a typical hydraulic manipulator (e.g. a Unimate MK-II industrial robot) the factor $\alpha$ must have a value of at least 8 deg.$^2$/s$^2$ for each revolute joint, however, if the value for $\alpha$ is small, the system becomes very sensitive to velocity error and produces control signals with some oscillation during tracking. If the value for $\alpha$ is selected very large, the step input response of the system may deteriorate somewhat. It is thus preferred to determine $\alpha$ based on equation (2) to ensure better operation of the system in both regulating and tracking responses. Fine movement of the equipment is also aided by linking $\alpha$ to set-point velocity $\theta_d$ and tuning $\alpha$ on-line, using a selected velocity, $\theta_{max}$ and a value of $\alpha_{max}$ in equation (2)

This use of formula (2) was found to reduce the overshoot observed in very small (within a couple of encoder resolutions of error) changes in setpoint position.

Although the above modification reduces the amount of overshoot in set-point regulating, it may not reduce it sufficiently under certain circumstances, particularly where there is a large change in set-point velocity. To overcome this problem, a second modification contained within the box formed by the dot dash line 60 is used. In this arrangement, the desired position $\theta_d$ is differentiated in 62 to provide $\dot\theta_d$ in line 64. This signal is further differentiated by 66 to provide an acceleration value $\ddot\theta_d$ in line 68. The signals $\dot\theta_d$ and $\ddot\theta_d$ are multiplied in multiplier 70 and the product and the sign of this multiplication is then delivered to the control 72 via line 74. The control 72 is an on/off type control, has 0 output if $\dot\theta_d$ and $\ddot\theta_d$ are in the same direction, i.e. if the product of $\dot\theta_d$ and $\ddot\theta_d$ is equal to or greater than 0, the controller 72 does not act and there is no output from the controller 72.

On the other hand, if the signal from the multiplier 70 is less than 0, then an output from controller 72 passes through the multiplier 76 and line 78 to the adder 34 (signal $\theta_G$) to increase the signal $\theta_e$ and provide a modified signal $\theta_m$ that is delivered to the adder 32. The amount or signal added in adder 34, $\theta_G$, is proportional to the position acceleration $\ddot\theta_d$, i.e. $\theta_G = K_a \ddot\theta_d$ where $K_a$ is a scaling factor.

This modification boosts the signal supplied to the adder 32 in an on/off manner without sudden control signal discontinuity and thus, enhances the deceleration of the system without sacrificing response time or stability (in the form of overshoot).

To compensate for actuator deadband due to hydraulic valve deadband or actuator stiction, the controller contained within the box indicated by the dot dash line 80 is applied. A differentiator 82, similar to 62 (or may use the signal from 62) to provide a position velocity signal $\dot\theta_d$ in line 84 and deliver this to a second nonlinear function applicator 86.

Also delivered to the nonlinear function applicator 86 via in line 90 is the derivative of the actual position signal $\theta_a$, to provide the actual velocity signal $\dot\theta_a$. The nonlinear function applicator 86 based on the desired position velocity signal $\dot\theta_d$ and the actual position velocity signal $\dot\theta_a$ generates a signal herewith called stiction (stick-induced) velocity error signal $\dot\theta_e^{stiction}$ using the nonlinear function $$\dot\theta_e^{stiction} = (\dot\theta_d - \dot\theta_a)\frac{\dot\theta_d^2}{\dot\theta_d^2 + \beta\dot\theta_a^2} \qquad (3)$$

where:

$\beta$ = a constant having a value of between 5 and 500 for most heavy-duty hydraulic applications The stick-induced velocity error $\dot\theta_e^{stiction}$ as above indicated is due to friction at the manipulator joints or actual deadband in the hydraulic actuation system which may cause some positional static error.

For high values of $\beta$, the stick-induced velocity error function sharply discriminates between velocity error due to sticking and those due to other causes, i.e. the estimate is close to zero unless there is a velocity error at low actual velocities. In other words, the estimate is large when the set-point is moving and the manipulator is not.

The constant $\beta$ is selected with a high value in preferably the order of about 50 (which value was found to work well) since if $\beta$ is very low, for example, if $\beta$ is 0, then $$\dot\theta_e^{stiction} = (\dot\theta_d - \dot\theta_a)$$

and is in effect nothing but velocity error signal. By choosing, $\beta$ high the stick induced velocity error will be well represented by the output signal $\dot\theta_e^{stiction}$.

This signal $\dot\theta_e^{stiction}$ is carded via a line 92 to the operation or functions 94 and 96. The operation or function 94 determines whether the signal $\dot\theta_e^{stiction}$ is between two limit values defined as $\theta_e^{-set}$ and $\theta_e^{+set}$. Depending whether or not the signal $\dot\theta_e^{stiction}$ is within these limits, the element 94 will generate an ON or an OFF signal to a logic timer block 98. If the signal $\dot\theta_e^{stiction}$ is within the range, it will send an OFF signal; if outside the range opposite signal, an ON signal is sent to the logic timer 98. For practical purposes the range $\theta_e^{-set}$ and $\theta_e^{+set}$ will normally be determined for each application. For heavy-duty hydraulic applications, five encoder resolution-widths per second was found to be adequate.

The logic timer block 98 also receives a signal via line 100 indicating the output signal U in line 44.

The operation or function 96 determines whether the signal $\dot\theta_e^{stiction}$ in line 92 is positive or negative depending on the direction of movement required for the intended action and set with the values for the signals $U_L$ and $U_U$ which provide the signal for movement of the manipulator arm, i.e. signal $U_L$ for movement in one direction, and $U_U$ for movement in the opposite direction.

The values for the signals $U_L$ and $U_U$ are preferably empirically derived and provide a signal of sufficient magnitude to ensure that the output signal from the system is sufficient to overcome stick induced deadband in the system.

The block 98 receives signals from the block 94 on each time cycle iteration of the control. This block then checks first to see whether the stick induced velocity error is high (i.e. the signal from block 94 to 98 is one) or not. Then it checks whether the total control signal U in line 44 is greater than $U_L$, or $U_U$ and if it is not, the control signal U should be boosted promptly to either $U_L$ or $U_U$ depending on the direction of motion. Thus, the block 98 signals the switch 58 above described to connect to Terminals 2 and 3 and substitute the signal $\theta_S$ in line 104 for the signal $\theta_I$ in line 56.

The signal $\theta_S$ in line 104 is derived from the signal $U_L$ or $U_U$ from which the signal U is subtracted in subtractor 106 and then proportioned as indicated at 108 and the proportional signal multiplied by the incoming signal in multiplier 105 to provide the proportion signal $\theta_S$ in line 104. This signal $\theta_S$ is used to input the controller 38 in place of the signal $\theta_I$.

The operation of the block 80 depends on whether $\theta_e^{stiction}$ is between the range $\theta_e^{\pm set}$ or not. If it is, do nothing, i.e. the switch 80 is disabled by sending a zero (0) to block 98. As soon as $\theta_e^{stiction}$ goes beyond $\theta_e^{\pm set}$ range, i.e. there is a significant stick-induced position error and the signal from 94 turns to one (1), telling the block 98 to boost the signal U to $U_L$ or $U_U$ (depending on the direction of movement). Now, to ensure U is $U_L/U_U$ (let say $U_L$), $U_I$ is boosted such that when added to Up, U becomes $U_L$. To do that, $U_L$ is compared with the current value of $U_P$ in subtractor 106 to see how much is lacking and this difference is then proportioned at 108. If there is a lack ($U_L - U_P > 0$), then the signal to 38 is reset as $(U_L - U_P)/K_I$ such that when multiplied by $K_I$ on block 38 and then added to $U_P$, $U_L$ is produced. In effect the signal $\theta_I$ (integral signal) has been reset to a new value. If there is no lack (i.e. $U_L - U_P < 0$), then we know $U_P$ is high enough and the signal from 94 is reset to zero (0) by block 98. Note that this is done in one time cycle. Thus, the function of block 80 is to ensure that each time $\theta_e^{stiction}$ goes beyond $\theta_e^{\pm set}$, reset the signal $\theta_I$ to a suitable value by just closing switch 58 to position 2–3 one cycle, then switch it back to position 1–2 again.

By resetting $\theta_I$ at point 58 we do two things. First, $U_I$ will set to $U_L U_U$. Second, since connection 2→3 will go back to 2→1, we ensure the $\theta_I$ is also updated at line 56 as well.

One immediate application of the invention can be towards computer control of heavy-duty industrial excavator-based machines. In particular, the invention is useful to handle environmental interactions. One way of controlling the manipulator interactions as seen from the environment is a position-based impedance control.

It will be apparent that the preferred form of the invention permits improved performance, particularly it permits
(i) improved tracking and regulating,
(ii) quick response to changes in set-point in spite of many nonidealities inherent with existing industrial hydraulic manipulators, described earlier,
(iii) quick reversal of direction without overshoot, and
(iv) accommodates both large and small changes in set-point.

Having described the invention, modifications will be evident to those skilled in the art without departing from the scope of the invention as defined in the appended claims.

We claim:

1. An improved position controller for a hydraulic manipulator comprising means for generating a position error signal ($\theta_e$), proportional-derivative controller means to define a first control signal ($U_P$, $U_{PD}$), means for determining a velocity factor $F_V$ based on a derivative of said position error signal ($\theta_e$) and a nonlinear function, means for generating an improved position error integral signal ($\theta_I$) based on the product of said position error signal and said velocity factor $F_V$, means to provide an integral control signal ($U_I$) based on said improved position error integral signal ($\theta_I$) and means for combining said integral control signal ($U_I$) with said first control signal ($U_P$, $U_{PD}$) to provide an output control signal U to control said manipulator.

2. An improved position controller for a hydraulic manipulator as defined in claim 1 wherein said means for generating a positional error signal ($\theta_e$) comprises, means to input a desired position ($\theta_d$), means to determine a then current actual position of said manipulator ($\theta_a$), means for subtracting said then current actual position of said manipulator ($\theta_a$) from said desired position ($\theta_d$), to provide said position error signal ($\theta_e$).

3. An improved controller for a hydraulic manipulator as defined in claim 2 wherein said velocity factor will be $$Fv = \frac{\alpha}{\alpha + \theta_e^2} \quad (1)$$

where:

$\alpha$=constant having a value of $$\alpha = \alpha_{max}\left[0.001 + \frac{|\dot{\theta}_d|}{\dot{\theta}_{max}}\right] \quad (2)$$

where:

$\alpha_{max}$=at least 8000 deg.$^2$/s$^2$ for most hydraulically-driven revolute arms, and 20 m$^2$/s$^2$ for most hydraulically-driven prismatic arms $\theta_e$=velocity error base on the position error $\theta_e$ $|\dot{\theta}_d|$=absolute desired velocity $\dot{\theta}_{max}$=a maximum set-point for velocity and will be 10 deg./s for most heavy duty hydraulic applications having revolute joints and 0.2 m/s for most heavy-duty hydraulic applications having prismatic joints.

4. An improved position controller for a hydraulic manipulator as defined in claim 3 wherein said controller further includes means for determining a stiction signal ($\theta_e^{stiction}$) based on a desired velocity $\dot{\theta}_d$ derived from a derivative of said desired position ($\theta_d$), means for determining whether said stiction signal ($\theta_e^{stiction}$) is within a selected range, and increasing the integral control signal $U_I$ to ensure the output control signal U is at least equal to $U_L$ or $U_U$, wherein $U_L$ is an empirically set value for movement in one direction of sufficient magnitude to ensure the output signal is sufficient to overcome stick induced deadband in the system, and $U_U$ is an empirically set value for movement in a direction opposite to said one direction of sufficient magnitude to ensure the output signal is sufficient to overcome stick induced deadband in the system.

5. An improved position controller for a hydraulic manipulator as defined in claim 4 wherein said means for determining of said stiction signal ($\theta_e^{stiction}$) further includes means for determining the derivative of said current actual position ($\theta_a$), to provide an actual velocity error signal $\dot{\theta}_a$ and means for determining said stiction signal ($\theta_e^{stiction}$) based on the function $$\theta_e^{stiction} = (\dot{\theta}_d - \dot{\theta}_a)\frac{\theta_d^2}{\theta_d^2 + \beta\theta_e^2}$$

where:

$\beta$=a constant having a value of between 5 and 500 for most heavy-duty hydraulic applications.

6. An improved position controller for a hydraulic manipulator as defined in claim 2 further comprising means to modify said position error signal ($\theta_e$), means to compare directions of first and second derivatives of said desired position ($\theta_d$) and means to adjust the value of the position error signal ($\theta_e$) modified only when the first and second derivatives have different signs by adding a modifying signal ($\theta_G$), proportional to desired acceleration, to the position error signal ($\theta_e$) to provide a modified position error signal ($\theta_m$) that is used to replace said position error signal ($\theta_e$) in defining said integral control signal ($U_I$).

7. An improved position controller for a hydraulic manipulator as defined in claim 2 wherein said controller further includes means for determining a stiction signal ($\theta_e^{stiction}$) based on a desired velocity $\theta_d$ derived from a derivative of said desired position ($\theta_d$), means for determining whether said stiction signal ($\theta_e^{stiction}$) is within a selected range, and increasing the integral control signal $U_I$ to ensure the output control signal U is at least equal to $U_L$ or $U_U$.

8. An improved position controller for a hydraulic manipulator as defined in claim 7 wherein said means for determining of said stiction signal ($\theta_e^{stiction}$) further includes means for determining the derivative of said current actual position ($\theta_a$), to provide an actual velocity error signal ($\theta_a$) and means for determining said stiction signal ($\theta_e^{stiction}$) based on the function $$\dot{\theta}_e^{stiction} = (\dot{\theta}_d - \dot{\theta}_a) \frac{\dot{\theta}_d^2}{\dot{\theta}_d^2 + \beta\dot{\theta}_a^2}$$

where:

$\beta$=a constant having a value of between 5 and 500 for most heavy-duty hydraulic applications.

9. An improved position controller for a hydraulic manipulator as defined in claim 1 wherein said velocity factor will be $$Fv = \frac{\alpha}{\alpha + \dot{\theta}_e^2} \quad (1)$$

where:

$\alpha$=constant having a value of at least 8 deg$^2$/s$^2$ for revolute joints and 0.02 m$^2$/s$^2$ for prismatic joints.

10. An improved position controller for a hydraulic manipulator as defined in claim 9 further comprising means to modify a position error signal ($\theta_e$), means to compare directions of first and second derivatives of a desired position ($\theta_d$) and means to adjust the value of the position error signal ($\theta_e$) modified only when the first and second derivatives have different signs by adding a modifying signal ($\theta_G$), proportional to desired acceleration, to the position error signal ($\theta_e$) to provide a modified position error signal ($\theta_m$) that is used to replace said position error signal ($\theta_e$) in defining said integral control signal ($U_I$).

11. An improved position controller for a hydraulic manipulator as defined in claim 1 further comprising means to modify a position error signal ($\theta_e$), means to compare directions of first and second derivatives of a desired position ($\theta_d$) and means to adjust the value of the position error signal ($\theta_e$) modified only when the first and second derivatives have different signs by adding a modifying signal ($\theta_G$), proportional to desired acceleration, to the position error signal ($\theta_e$) to provide a modified position error signal ($\theta_m$) that is used to replace said position error signal ($\theta_e$) in defining said integral control signal ($U_I$).

12. A method of controlling a hydraulic manipulator comprising defining a position error signal ($\theta_e$), defining a first control signal ($U_P$, $U_{PD}$) based on said position error signal $\theta_e$ and derivative of it, generating an improved position error integral signal ($\theta_I$) base on a product of said position error signal and a velocity factor $F_V$, said velocity factor $F_V$ being based on a derivative of said position error signal ($\theta_e$) and a nonlinear function, providing integral control signal ($U_I$) based on said improved position error integral signal ($\theta_I$) and combining said integral control signal ($U_I$) with said first control signal ($U_P$, $U_{PD}$) to provide an output control signal U to control said manipulator.

13. A method as defined in claim 12 wherein said defining a position error signal ($\theta_e$) comprises, inputting a desired position ($\theta_d$), determining a then current actual position of said manipulator ($\theta_a$), subtracting said then current actual position of said manipulator ($\theta_a$) from said desired position ($\theta_d$), to provide said position error signal ($\theta_e$).

14. A method as defined in claim 13 wherein said velocity factor will be $$Fv = \frac{\alpha}{\alpha + \dot{\theta}_e^2}$$

where:

$\alpha$=a constant having a value of at least 8 deg$^2$/s$^2$ for revolute joints and 0.02 m$^2$/s$^2$ for prismatic joints.

15. A method as defined in claim 14 further comprising modifying said position error signal ($\theta_e$) by determining first and second derivatives of said desired position ($\theta_d$), comparing directions of said first and second derivatives and adjusting the value of said position error signal ($\theta_e$) only when the first and second derivatives have different signs by adding a modifying signal ($\theta_G$), proportional to desired accelerations to the position error signal ($\theta_e$) to provide a modified position error signal ($\theta_m$) to be used to replace said position error signal ($\theta_e$) in defining said integral control signal ($U_I$).

16. A method as defined in claim 15 wherein further including determining a stiction signal ($\theta_e^{stiction}$) based on a desired velocity $\theta_d$ derived from a derivative of said desired position ($\theta_d$), determining whether said stiction signal ($\theta_e^{stiction}$) is within a selected range, and increasing said integral control signal $U_I$ to ensure the output control signal U is at least equal to $U_L$ or $U_U$, wherein:

$U_L$ is an empirically set value for movement in one direction of sufficient magnitude to ensure the output signal is sufficient to overcome stick induced deadband in the system, and $U_U$ is an empirically set value for movement in a direction opposite to said one direction of sufficient magnitude to ensure the output signal is sufficient to overcome stick induced deadband in the system.

17. A method as defined in claim 16 wherein said determining of said stiction signal ($\theta_e^{stiction}$) further includes determining the derivative of said current actual position ($\theta_a$), to provide an actual velocity error signal $\theta_a$ and determining said stiction signal ($\theta_e^{stiction}$) based on the function $$\dot{\theta}_e^{stiction} = (\dot{\theta}_d - \dot{\theta}_a) \frac{\dot{\theta}_d^2}{\dot{\theta}_d^2 + \beta\dot{\theta}_a^2}$$

where:

$\beta$=a constant having a value of between 5 and 500 for most heavy-duty hydraulic functions.

18. A method as defined in claim 12 wherein said velocity factor will be $$F_V = \frac{\alpha}{\alpha + \theta_e^2} \quad (1)$$

where:

$\alpha$=constant having a value of $$\alpha = \alpha_{max}\left[0.001 + \frac{|\theta_d|}{\theta_{max}}\right] \quad (2)$$

where:

$\alpha_{max}$=at least 8000 deg.$^2$/s$^2$ for most hydraulically-driven revolute arms, and 20 m$^2$/s$^2$ for most hydraulically-driven prismatic arms $\theta_e$=velocity error base on the position error $\theta_e$ $|\theta_d|$=absolute desired velocity $\theta_{max}$=a maximum set-point for velocity and will be 10 deg./s for most heavy duty hydraulic applications having revolute joints and 0.2 m/s for most heavy-duty hydraulic applications having prismatic joints.

19. A method as defined in claim 18 further comprising modifying said position error signal ($\theta_e$) by determining first and second derivatives of a desired position ($\theta_d$), comparing directions of said first and second derivatives and adjusting the value of said position error signal ($\theta_e$) only when the first and second derivatives have different signs by adding a modifying signal ($\theta_G$), proportional to desired accelerations to the position error signal ($\theta_e$) to provide a modified position error signal ($\theta_m$) to be used to replace said position error signal ($\theta_e$) in defining said integral control signal ($U_I$).

20. A method as defined in claim 19 wherein further including determining a stiction signal ($\theta_e^{stiction}$) based on a desired velocity $\theta_d$ derived from a derivative of said desired position ($\theta_d$), determining whether said stiction signal ($\theta_e^{stiction}$) is within a selected range, and increasing the integral control signal $U_I$ to ensure the output control signal $U$ is at least equal to $U_L$ or $U_U$.

wherein:

$U_L$ is an empirically set value for movement in one direction of sufficient magnitude to ensure the output signal is sufficient to overcome stick induced deadband in the system, and $U_U$ is an empirically set value for movement in a direction opposite to said one direction of sufficient magnitude to ensure the output signal is sufficient to overcome stick induced deadband in the system.

* * * * *